(12) United States Patent
Sakai et al.

(10) Patent No.: US 8,690,303 B2
(45) Date of Patent: Apr. 8, 2014

(54) IMAGE FORMING METHOD

(75) Inventors: Minoru Sakai, Kanagawa (JP);
Terukazu Yanagi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 175 days.

(21) Appl. No.: 12/891,828

(22) Filed: Sep. 28, 2010

(65) Prior Publication Data
US 2011/0074868 A1 Mar. 31, 2011

(30) Foreign Application Priority Data

Sep. 29, 2009 (JP) .................................. 2009-224454
Sep. 27, 2010 (JP) .................................. 2010-215948

(51) Int. Cl.
*B41J 2/01* (2006.01)
*B41J 2/21* (2006.01)

(52) U.S. Cl.
CPC . *B41J 2/2107* (2013.01); *B41J 2/01* (2013.01)
USPC ........................................... 347/95; 347/100

(58) Field of Classification Search
CPC .................. B41J 2/01; B41J 2/2107
USPC ................... 347/95–100, 102; 523/160, 161; 106/31.13, 31.6; 428/32.18, 31.18
See application file for complete search history.

(56) References Cited

U.S. PATENT DOCUMENTS

| 3,107,139 | A | * | 10/1963 | Witherington et al. .... 264/235.8 |
| 4,261,473 | A | * | 4/1981 | Yamada et al. ................. 215/379 |
| 5,750,592 | A | * | 5/1998 | Shinozuka et al. ............ 523/161 |
| 6,117,537 | A | * | 9/2000 | Butters et al. ................. 428/32.1 |
| 7,081,330 | B2 | * | 7/2006 | Takamiya ...................... 430/302 |
| 7,442,245 | B2 | * | 10/2008 | Blease et al. ................ 106/31.58 |
| 7,919,156 | B2 | * | 4/2011 | Doi et al. .................... 428/32.38 |
| 2003/0037699 | A1 | * | 2/2003 | Yatake ........................ 106/31.58 |
| 2003/0069329 | A1 | * | 4/2003 | Kubota et al. .................. 523/160 |
| 2004/0063807 | A1 | * | 4/2004 | Wang et al. ..................... 523/160 |
| 2005/0176847 | A1 | * | 8/2005 | Cagle ............................ 523/160 |
| 2006/0007287 | A1 | * | 1/2006 | Cagle et al. ..................... 347/100 |
| 2007/0234931 | A1 | * | 10/2007 | Rehman ....................... 106/31.6 |
| 2009/0110830 | A1 | * | 4/2009 | Shimada et al. .............. 427/256 |
| 2009/0130312 | A1 | * | 5/2009 | Ono et al. ..................... 427/288 |
| 2009/0202724 | A1 | * | 8/2009 | Arai et al. ..................... 427/256 |
| 2010/0033523 | A1 | * | 2/2010 | Suzuki et al. ..................... 347/9 |

FOREIGN PATENT DOCUMENTS

| JP | 2005-220352 A | 8/2005 |
| JP | 2007-277330 A | 10/2007 |
| JP | 2008-101192 A | 5/2008 |

* cited by examiner

*Primary Examiner* — Matthew Luu
*Assistant Examiner* — Rut Patel
(74) *Attorney, Agent, or Firm* — SOLARIS Intellectual Property Group, PLLC

(57) ABSTRACT

An image forming method includes ejecting an ink composition including a volatile organic solvent with a solubility parameter of 20 $MPa^{1/2}$ to 25 $MPa^{1/2}$, acid-functionalized polymer colloid particles with a glass transition temperature of 25° C. to 85° C., and a pigment with a surface at least a part of which is coated with a polymer, onto a non-porous substrate by an ink jet method to form an image, and the absolute value of the difference between the solubility parameter of the non-porous substrate and the solubility parameter of the volatile organic solvent of the ink composition falls within 15 $MPa^{1/2}$.

12 Claims, No Drawings

IMAGE FORMING METHOD

CROSS-REFERENCE TO RELATED APPLICATION

This application claims priority under 35 USC 119 from Japanese Patent Application Nos. 2009-224454, filed on Sep. 29, 2009, and 2010-215948, filed on Sep. 27, 2010, the disclosures of which are incorporated by reference herein.

BACKGROUND OF THE INVENTION

1. Field of the Invention

The present invention relates to an image forming method in which ink is ejected using an ink jet method to form an image.

2. Description of the Related Art

As a recording medium for ink jet printing, various recording mediums have been examined, and above all, a technique for forming high quality image is required. In ink, various ink substrates have been examined from the viewpoints of water resistance, light-fastness, and the like.

For example, a pigment is used as a colorant that is one of the components contained in ink substrates, and the pigment is dispersed for use in a medium such as water. When the pigment is dispersed for use, dispersion particle diameter in dispersing, stability after dispersing, uniformity in size, and ejection performance from an ejecting head are important, and techniques for improving them have been examined.

Meanwhile, unlike a case of forming an image on a recording medium having porosity such as normal paper and having relative satisfactory absorptivity of ink, even when an image is formed using a non-porous substrate such as polyester as the recording medium, it is preferable drying can be performed quickly after the ink droplets are ejected, fixability, image quality and the like are satisfactory, and an image without stickiness can be obtained after drying.

Concerning the circumstances, printing ink including a colorant and resin and containing a solid component that is solid in an ink at 25° C., a liquid component that is liquid in an ink at 25° C. with a boiling point higher than that of water, and water is disclosed, and it is considered that there is no problem with the drying speed (e.g., Japanese Patent Application Laid-Open (JA-P) No. 2008-101192). As the liquid component, a wetting agent with a high boiling point of 230° C. or higher, and specifically, glycerin, 1,3-butanediol, 3-methyl-1,3-butanediol, 2-pyrrolidinone, and N-methyl-2-pyrrolidinone are disclosed.

In addition, ink jet ink, which includes an aqueous liquid vehicle including a volatile cosolvent having a boiling point of 285° or lower, and a pigment colorant in which acid-functionalized polymer colloid particles dispersed in the liquid vehicle and polymers are coupled, is disclosed (e.g., JP-A No. 2005-220352), and it is considered that the ink has an excellent adhesive property for non-porous substrates.

An aqueous ink composition, which contains resin emulsion having a glass transition temperature of 30° C. or higher in which kinds of monomers such as acryl acid are polymerized, pigment dispersion liquid allows a dispersion polymer to contain a pigment and is rendered dispersible in water, and triethylene glycol monobutyl ether, is disclosed (e.g., JP-A No. 2007-277330), and the ink which can simultaneously achieve dispersion stability (storage stability) and excellent printing quality.

SUMMARY OF THE INVENTION

The present invention has been made in view of the above circumstances and provides an image forming method.

A first aspect of the present invention provides an image forming method including ejecting an ink composition including a volatile organic solvent with a solubility parameter (SP value) of 20 $MPa^{1/2}$ to 25 $MPa^{1/2}$, acid-functionalized polymer colloid particles with a glass transition temperature of 25° C. to 85° C., and a pigment with a surface at least a part of which is coated with a polymer, onto a non-porous substrate by an ink jet method to form an image, wherein the absolute value of the difference between the solubility parameter of the non-porous substrate and the solubility parameter of the volatile organic solvent of the ink composition falls within 15 $[MPa^{1/2}]$.

DETAILED DESCRIPTION OF THE INVENTION

Hereinafter, an image forming method of an embodiment of the invention is described in detail.

The image forming method according to an aspect of the invention includes a process (hereinafter, referred to as "image forming process") of ejecting an ink composition (hereinafter, referred to merely as "ink") including a volatile organic solvent with a solubility parameter (hereinafter, referred to as "SP value") from 20 to 25 $MPa^{1/2}$, acid-functionalized polymer colloid particles with a glass transition temperature (hereinafter, referred to as "Tg") from 25 to 85° C., and a pigment with a surface, at least a part of which is coated with a polymer, onto a non-porous substrate by an ink jet method to form an image, and an absolute value ($|\Delta SP|$) of the difference between the SP value of the non-porous substrate and the SP value of the volatile organic solvent of the ink composition falls within 15 $MPa^{1/2}$. In addition, "| |" represents an absolute value.

In the aspect of the invention, the ink used in forming the image on the non-porous substrate has a composition including the volatile organic solvent of the SP value=20 to 25 $MPa^{1/2}$, and the acid-functionalized polymer colloid particles of Tg=25 to 85° C., the pigment having a surface, at least a part of which is coated with the polymer, and the difference in SP value between the volatile organic solvent and the non-porous substrate is made to fall within a predetermined value, thereby improving fixability and drying speed while preventing stickiness of the image.

In the image forming process according to the aspect of the invention, the ink composition is ejected by the ink jet method to form the image on the non-porous substrate. In forming the image based on the ink jet method, the ink composition is ejected from an ink jet head by applying energy to form a color image, for example, a method described in Paragraph No. 0093 to 0105 of JP-A No. 2003-306623 can be applied.

The ink jet method is not particularly limited, and may be any one of the known methods, for example, an electron control method of ejecting ink using electrostatic attractive force, a drop on-demand method (pressure pulse method) using vibration pressure of a piezoelectric element, a sound ink jet method of changing an electrical signal to a sound beam to irradiate ink with the sound beam and ejecting the ink using radiation pressure, and a thermal ink jet (Bubble Jet (registered trademark)) method of heating ink to form bubble and using the generated pressure. As the ink jet method, particularly, an ink jet method described in JP-A No. 54-59936 can be effectively used in which ink affected by thermal energy causes a rapid volume change and the ink is ejected from nozzles by the action caused by the state change.

The ink jet method includes a method of ejecting plural inks with low concentration called photo ink in a small volume, a method of improving image quality using plural inks with substantially the same color and different concentrations, and a method of using colorless transparent ink.

The ink jet head for the ink jet method may be any of an on-demand method and a continuance method. Examples as the ejecting method may include an electrical-mechanical conversion method (for example, single cavity type, double cavity type, bender type, piston type, share-mode type, shared wall type), an electrical-thermal conversion method (for example, thermal ink jet type, bubble jet (registered trade mark) type), an electrostatic absorption method (for example, electric field control type, slit jet), and a discharge method (for example, spark jet type), and any ejecting method may be used.

The ink nozzles and the like used to perform printing by the ink jet method are not particularly limited, and may be appropriately selected according to the intended use.

Non-Porous Substrate

In the image forming method according to the aspect of the invention, the non-porous substrate is used as the recording medium. The non-porous substrate is, for example, normal paper with little absorption of ink, that is, a substrate except for paper such as coated paper, and specifically, a substrate with the Cobb water absorption degree of 1 g/m² or less for contact time of 120 seconds in a water-absorptivity test based on JIS P8140 on the surface thereof.

The Cobb water absorption degree is measured by a water-absorptivity test based on JIS P8140, in which the amount of water absorbed when water comes into contact with one surface of the substrate for a predetermined time. In the aspect of the invention, the contact time 120 seconds.

In the image forming method according to the aspect of the invention, when an image is formed on the substrate in which ink absorption is slow, desired drying and fixing are performed after ink ejection, and stickiness is suppressed after drying is completed while reducing the time necessary for the drying and fixing. That is, in the aspect of the invention, an ink composition with the following composition is used, and the SP value of a volatile organic solvent in the ink composition is not greatly different from the SP value of the non-porous substrate.

Specifically, an absolute value ($|\Delta SP|$) that is a difference between the SP value of the non-porous substrate and the SP value of the volatile organic solvent in the ink composition falls within 15 MPa$^{1/2}$. When the value of $|\Delta SP|$ is larger than 15 MPa$^{1/2}$, particularly fixability deteriorates, and the stickiness of the image after drying cannot be prevented. The value of $|\Delta SP|$ is more preferably within 14 MPa$^{1/2}$, from the viewpoints of at least one of fixability and suppression of stickiness of an image. The lower limit of the value of $|\Delta SP|$ is preferably 10 MPa$^{1/2}$.

The SP value of the non-porous substrate is a value calculated in the same manner as calculation of the SP value of the volatile organic solvent contained in the following ink composition.

The non-porous substrate according to the aspect of the invention is preferably a plastic film. Examples of the plastic film include a polyester substrate such as polyethylene terephthalate (SP value=10.7 MPa$^{1/2}$), acetyl cellulose (SP value=10.9 MPa$^{1/2}$), and diacetate cellulose (SP value=11.4 MPa$^{1/2}$).

Particularly, a polyethylene terephthalate film or a triacetate cellulose film is preferable from the viewpoint that affinity with ink is good, ink is easily matched with the surface of the substrate in the case of the composition of the present application, and a uniform image can be formed.

Ink Composition

The ink composition used to form an image includes at least a volatile organic solvent with a solubility parameter (SP value) from 20 to 25 MPa$^{1/2}$, acid-functionalized polymer collide particles, a glass transition temperature (Tg) of which is 25 to 85° C., and a pigment, at least a part of a surface of which is coated with polymer, and may be configured using other components optionally.

Volatile Organic Solvent

The ink composition according to the aspect of the invention contains at least one kind of volatile organic solvent with an SP value (solubility parameter) from 20 to 25 MPa$^{1/2}$. Since the ink composition contains the volatile organic solvent with the relatively low SP value, fixability and the effectiveness of suppressing stickiness of the image are improved.

The SP value (solubility parameter) of the volatile organic solvent is from 20 to 25 MPa$^{1/2}$. When the SP value is less than 20 MPa$^{1/2}$, affinity with water is small, and the volatile organic solvent is not uniformly mixed with ink or is easily volatilized, thereby deteriorating fixability, which is not preferable. When the SP value is more than 25 MPa$^{1/2}$, the difference from the SP value of the non-porous substrate is too large, and the stickiness of the image after drying cannot be prevented.

Particularly, the SP value of the volatile organic solvent is preferable from 20 to 24 MPa$^{1/2}$, from the viewpoints of fixability and prevention of the stickiness of the image after drying.

The SP value (solubility parameter, unit: MPa$^{1/2}$) is a value represented by the square root of molecule aggregate energy, and is calculated by a method described in R. F. Fedors, Polymer Engineering Science, 14, p. 147 to 157 (1974), the disclosure of which is incorporated by reference herein.

Examples of the volatile organic solvent according to the aspect of the invention preferably include diethylene glycol monoethyl ether (SP value: 22.4 MPa$^{1/2}$), diethylene glycol monobutyl ether (SP value: 21.5 MPa$^{1/2}$), triethylene glycol monomethyl ether (SP value: 22.1 MPa$^{1/2}$), triethylene glycol monoethyl ether (SP value: 21.7 MPa$^{1/2}$), triethylene glycol monobutyl ether (SP value: 21.1 MPa$^{1/2}$), dipropylene glycol monomethyl ether (SP value: 21.3 MPa$^{1/2}$), tripropylene glycol monomethyl ether (SP value: 20.4 MPa$^{1/2}$), and an alkylene oxide adduct of glycerin represented by the following structural formula (1).

Structural Formula (1)

In the structural formula (1), each of l, m, and n represents an integer of 1 or more, and they satisfy l+m+n=3 to 15. When the value of l+m+n is 3 or more, a curl suppression effect is satisfactory. When the value is 15 or less, it is possible to keep a satisfactory ejection property. The value of l+m+n is preferably from 3 to 12, and more preferably from 3 to 10. AO in the structural formula (1) represents at least of ethyleneoxy (may be abbreviated as EO) and propyleneoxy (may be abbreviated as PO), and a propyleneoxy group is preferably among them. AO of $(AO)_l$, $(AO)_m$, and $(AO)_n$ may be the same or different.

Hereinafter, an example of a compound represented by the structural formula (1) is represented. Values in parentheses are SP values (the unit thereof is omitted). In the aspect of the invention, the compounds are not limited thereto.

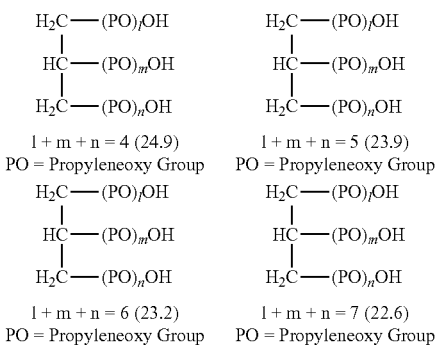

$nC_4H_9O(AO)_4$—H
(AO=EO or PO (EO:PO=1:1), SP value=20.1 MPa$^{1/2}$)
HO(PO)$_3$—H(SP value=24.7 MPa$^{1/2}$)
HO(PO)$_7$—H(SP value=21.2 MPa$^{1/2}$)
EO and PO represent an ethyleneoxy group and a propyleneoxy group, respectively.

As the alkylene oxide adduct of glycerin, a commercially available product may be used. For example, as polyoxy propylated glycerin (ether of polypropylene glycol and glycerin), there are SUNNIX GP-250 (average molecular weight of 250), SUNNIX GP-400 (average molecular weight of 400), and SUNNIX GP-600 (average molecular weight of 600) (trade names) manufactured by Sanyo Chemical Industries, Ltd.; LEOCON GP-250 (average molecular weight of 250), LEOCON GP-300 (the average molecular weight of 300), LEOCON GP-400 (average molecular weight of 400), and LEOCON GP-700 (average molecular weight of 700) (trade names) manufactured by Lion Corporation; and polypropylene triol glycol.triol type (average molecular weights of 300 and 700) manufactured by Wako Pure Chemical Industries, Ltd.

Particularly, a boiling point of the volatile organic solvent is preferably from 120° C. to 285° C. When the boiling point is 120° C. or higher, the volatile organic solvent is difficult to volatilize at a normal temperature, and when the boiling point is 285° C. or lower, the volatile organic solvent is smoothly volatilized by drawing, drying, and fixation processes and it is possible to obtain the film forming properties of a proper latex, which is advantageous. The boiling point is more preferably from 150° C. to 250° C. from this viewpoint.

A decomposition temperature of the volatile organic solvent is preferably 300° C. or higher. When the decomposition temperature is 300° C. or higher, it is advantageous from preparation to usage of the ink from the viewpoints of storage and decomposition stability.

The decomposition temperature is more preferably from 300° C. to 500° C. from this viewpoint.

As the volatile organic solvent, a single kind may be used, or two or more kinds may be mixed.

The combination when mixing two or more kinds of volatile organic solvents is not particularly limited, but when the alkylene oxide adduct of glycerin represented by the structural formula (1) and alkylene glycol alkyl ether (preferably, di- or tri-alkylene glycol monoalkyl ether (preferable carbon number of each alkyl site being from 1 to 4)) are combined, the fixability is further improved, and it is possible to effectively suppress the stickiness of an image after drying as well as blocking. In this case, a mixing weight ratio (a:b) of the alkylene oxide adduct (a) of glycerin represented by the structural formula (1) to the alkyl glycol alkyl ether (b) is preferably from 1:5 to 5:1, and more preferably in the range of 1:2.5 to 2.5:1, for the same reason.

The total content of the volatile organic solvent in the ink composition is preferably from 5% by mass to 18% by mass in the total mass of the composition. When the content of the volatile organic solvent is within this range, there is an advantage in performing a fixing and drying process after printing in a short time, for example, even when a printing speed is further raised by single pass printing or the like, and it is possible to suppress the stickiness of the image after drying and further to effectively prevent blocking from occurring.

Particularly, the content of the volatile organic solvent is more preferably from 6% by mass to 16% by mass in the total mass of the composition, and particularly preferably from 8% by mass to 14% by mass.

Acid-Functionalized Polymer Colloid Particles

The ink composition according to the aspect of the invention contains at least one kind of acid-functionalized polymer colloid particles with Tg (glass transition temperature) from 25° C. to 85° C. The acid-functionalized polymer colloid particles are particles in which polymer particles having an acid group are added to (preferably, dispersed in) a liquid medium such as water, and includes a polymer latex having a neutralized acid group. The acid group can prevent particles from being aggregated, by applying electrostatic stability to the polymer colloid particles.

Tg (glass transition temperature) of the acid-functionalized polymer colloid particles is from 25° C. to 85° C. When the Tg is lower than 25° C., stickiness remains on the image after drying, and when the Tg is higher than 85° C., fixability of the image deteriorates. Particularly, the Tg is preferably from 30° C. to 80° C., and more preferably from 35° C. to 75° C., from the viewpoints of the fixability and the prevention of stickiness of the image after drying.

Tg of the polymer particles can be appropriately controlled according to a generally used method. Tg of the polymer particles can be controlled within a desired range, for example, by appropriately selecting the kinds of polymerizable groups of monomers constituting the polymer, kinds or constituent ratios of substituent groups on monomers, molecular weights of polymer molecules constituting polymer particles. "Measured Tg" which can be obtained by real measurement is applied to Tg, but "calculated Tg" calculated by the following formula is applied when it is difficult to perform measurement by decomposition of the polymer.

Specifically, the "measured Tg" is a value measured by general measurement conditions using a differential scanning calorimeter (DSC) EXSTAR6220 (trade name) manufactured by SII NanoTechnology, Inc. The "calculated Tg" is a value calculated using Tg values of homopolymers of monomers by the following formula (1).

$$1/Tg = \Sigma(X_i/Tg_i) \quad (1)$$

In the formula (1), for a polymer that is the calculation target, n kinds of monomer components from i=1 to n are copolymerized. $X_i$ represents a weight fraction of the i-th monomer, and $Tg_i$ represents a glass transition temperature (absolute value) of a homopolymer of the i-th monomer (=$\Sigma X_i$=1). $\Sigma$ represents the sum of i=1 to n. As the value (Tgi) of the homopolymer glass transition temperature of each monomer, a value of Polymer Handbook (3$^{rd}$ Edition) (written by J. Brandrup, E. H. Inmmergut (Wiley-Interscience, 1989) is employed.

The polymer colloid particles having a surface acid group neutralized as the acid-functionalized polymer colloid particles can be prepared by forming a monomer emulsion (this forms polymer colloid particles) formed by copolymerizing acid monomers with other monomers. The acid monomers may exist from 1% by mass to 15% by mass of the total monomers used to form the polymer colloid particles. An example of the acid group includes a calboxylic group. As the acid monomers, polymer particles ((meth)acryl acid-functionalized polymer colloid particle) having a calboxylic group in which (meth)acryl acid is copolymerized as a copolymerization component may be formed using, for example, (meth)acryloyl group-containing monomers (e.g., (meth) acryl acid).

As an example of the polymer colloid particles, polymer particles may be formed by copolymerization. The example includes particles prepared using monomer emulsion including styrene, hexylmethacrylate, ethylene glycol dimethacrylate, and methacryl acid in various polymerization ratios. Examples of the monomers constituting the polymer colloid particles include styrene, alkyl methacrylate of a carbon number of 1 to 8, alkyl acrylate of a carbon number of 1 to 8, ethylene glycol methacrylate, dimethacrylate, methacryl acid, and acryl acid.

In the aspect of the invention, the acid-functionalized polymer colloid particles are preferably polymer particles, at least a particle size of which is from 20 nm to 500 nm (preferably from 100 nm to 300 nm) and/or at least a weight-average molecular weight (Mw) is from 10,000 to 2,000,000 (preferably from 40,000 to 100,000). The particle size is the volume average diameter measured by a light scattering method.

Generally, the acid-functionalized polymer colloid particles may be polymer particles configured by randomly copolymerizing plural monomers, and may have a surface acid group subjected to at least one of cross-linking and/or neutralization.

The acid-functionalized polymer colloid particle content in the ink composition is preferably from 4% by mass to 15% by mass for the total mass of the composition, and more preferably from 5% by mass to 10% by mass. When the acid-functionalized polymer colloid particles having a predetermined Tg are contained within the range, fixability is improved and the stickiness of an image after drying is reduced.

Pigment

The ink composition according to the aspect of the invention contains at least one kind of pigments, at least a part of a surface of which is coated with polymer (hereinafter referred to as "polymer-coated pigment"). The pigment may be self-dispersing pigment or non-self-dispersing pigment.

The self-dispersing pigment includes a pigment which is chemically surface-modified by electrical charge or a polymer group. The pigment is dispersed in a liquid vehicle by the chemical modification, and this state is substantially maintained. When the pigment is surface-modified by the polymer group, the pigment to which the polymers bind may be further modified. A pigment used to form the pigment to which the polymers bind may be a non-self-dispersing pigment using a separate dispersant (for example, a polymer, oligomer, or surfactant) which is not bound to the pigment.

Examples of the polymer-coated pigment include a polymer-adsorbing pigment, a polymer graft pigment, a polymer-capsulized pigment, and a pigment which polymers are covalently bonded on the surface.

The coated pigment may be an organic pigment, for example, an azo pigment, a polycyclic pigment, a dye chelate, a nitro pigment, a nitroso pigment, and an aniline black. Among them, the azo pigment and the polycyclic pigment are more preferable. Examples of the azo pigment include an azo lake, an insoluble azo pigment, a condensation azo pigment, and a chelate azo pigment. Examples of polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include a basic dye type chelate, and an acid dye type chelate.

Examples of an inorganic pigment include titanium oxide, iron oxide, calcium carbonate, barium sulfate, aluminum hydroxide, barium yellow, cadmium red, chrome yellow, and carbon black. Among them, the carbon black is preferable.

Examples of the carbon black include those produced by known methods such as a contact method, a furnace method, and a thermal method. When a pigment is used as the coloring material, it is preferable that a dispersant is used with the pigment or a surface-processed pigment is used as the pigment, from the viewpoint of dispersion stability in ink.

Examples of the pigment to which polymers are bound include a carbon black pigment to which styrene acryl copolymers are bound, a carbon black pigment which is micro-capsulized with styrene acryl copolymers, and a carbon black pigment to which styrene acryl copolymers are grafted. A weight-average molecular weight of the copolymers bound to the pigment is preferably from 10,000 to 30,000.

The content of the polymer-coated pigment in the ink composition is preferably from 2% by mass to 10% by mass in the total mass of the composition, and more preferably from 3% by mass to 6% by mass. When the content of the polymer-coated pigment is within the range, it is possible to obtain sufficient image density and to adjust the liquid viscosity of the ink to a proper range, which is preferable.

Water

The ink composition according to the aspect of the invention may contain water, and the quantity of water is not particularly limited. In particular, the content of water is preferably from 30% by mass to 80% by mass in the total mass of the ink composition, and more preferably from 50% by mass to 70% by mass, from the viewpoint of ensuring stability and ejection reliability.

Other Components

The ink composition according to the aspect of the invention may be configured using other components such as a surfactant, a cosolvent, a buffer, a biocide, a sequestrant, a viscosity modifier, and water, optionally.

In addition to the volatile organic solvent, for example, cosolvents such as aliphatic alcohol, aromatic alcohol, diol, glycol ether, polyglycol ether, caprolactam, formamide, aceteamide, and long-chain alcohol may be used. Examples of the cosolvents include primary aliphatic alcohol, secondary aliphatic alcohol, 1,2-alcohol, 1,3-alcohol, 1,5-alcohol, ethylene glycol alkyl ether, propylene glycol alkyl ether, relative high order homologue of polyethylene glycol alkyl ether, N-alkyl caprolactam, non-substituent caprolactam, substituent and non-substituent formamide, and substituent and non-substituent acetamide.

Examples of the surfactant include alkyl polyethylene oxide, alkyl phenyl polyethylene oxide, polyethylene oxide block copolymer, acetylene polyethylene oxide, polyethylene oxide (di)ester, polyethylene oxide amine, protonated polyethylene oxide amine, protonated polyethylene oxide amide, dimethicone copolymer, fluoroalkyl polyethylene oxide, and substituent amine oxide. When the surfactant is added, the content of the surfactant in the ink composition may be from 0.01 by mass to 10% by mass.

At least one of another cosolvent, a wetting agent, and a surfactant which function as a wetting agent such as aliphatic hydrocarbon of a carbon number of 5 to 22, silicon, or fluorocarbon surfactant may be included.

EXAMPLES

Hereinafter, the present invention will be described more specifically with reference to Examples, but it should be understood that the invention is only restricted by its Claims and not by the Examples below. "Part" in the following Examples is a part by mass, unless specified otherwise.

Preparation of Latex Polymer Colloid Liquid 1

Water of about 1160 ml was put into a reaction container, and was heated to 90° C. in the container. An initiator solution including a potassium persulfate initiator of 1.39 g in water of 160 ml was prepared. 32 ml of the prepared initiator solution was added into the reaction container, and agitated.

Separately from this, a first monomer emulsion including, in water 159.4 ml, styrene of 80 g, hexymethacrylate of 292 g, ethylacrylate of 4 g, methacryl acid of 24 g, t-dodecyl mercaptan chain transfer agent of 1.2 g, and 30% Rhodafac RS 710 of 8.0 g was prepared.

The obtained monomer emulsion was dropped and added to the reaction container for 30 minutes. The reactant was stirred and kept for 3 hours at 90° C. Then, the reactant was cooled to 50° C. Then, potassium hydroxide (50% water solution) is added thereto, and pH of a produced latex solution was adjusted to 8.7. Then, the latex solution was cooled to room temperature, the latex solution was filtrated with a 200-mesh filter fabric, and a latex polymer colloid liquid 1 (acid-functionalized polymer colloid particles) was obtained. A volume average particle size of the latex polymer was measured by particle size measurement based on a light scattering method, and the size was 183 nm. A solid content was 22% by mass by solid content measurement, and a glass transition temperature (Tg) was 19.4° C.

Preparation of Latex Polymer Colloid Liquids 2 to 6

Latex polymer colloid liquids 2 to 6 shown in the following table were prepared in the same manner as the process of the latex polymer colloid liquid 1, except that kinds of monomers and composition ratios were changed as shown in the following table 1. Tg of the polymer latex is shown in Table 1.

TABLE 1

| Latex Polymer Colloid Liquid No. | MMA | St | HeMA | EA | 2-EHA | MAA | Tg [° C.] |
|---|---|---|---|---|---|---|---|
| 1 | — | 20 | 73 | 1 | — | 6 | 19.4 |
| 2 | — | 30 | 63 | 1 | — | 6 | 28.7 |
| 3 | — | 40 | 53 | 1 | — | 6 | 38.5 |
| 4 | 75 | — | — | — | 10 | 15 | 93 |
| 5 | 75 | — | — | — | 15 | 10 | 77.1 |
| 6 | 65 | — | — | — | 25 | 10 | 55.9 |

[Unit: Mass Ratio]
MMA: methylmethacrylate
St: styrene
HeMA: hexylmethacrylate
EA: ethyleacrylate
2-EHA: 2-ethyl hexylacrylate
MAA: methacryl acid Preparation of Ink Jet Ink 1,4-butanediol (SP value=30.27 $MPa^{1/2}$) of 8% by mass, diethylene glycol (SP value=30.62 $MPa^{1/2}$) of 8% by mass, Zonyl FSO (fluorocarbon surfactant manufactured by DuPont, Inc.) of 0.5% by mass, carbon black pigment of 2% by mass capsulized to styrene acryl copolymer, the latex polymer colloid liquid 1 of 4% by mass (solid content), and water (the balance which makes 100% by mass in total) were mixed to prepare an ink jet ink 1.

In the preparation of the ink jet ink 1, as shown in the following table 2, ink jet inks 2 to 23 were prepared in the same manner as the preparation of the ink jet ink 1 except that the volatile organic solvent and the latex polymer colloid liquid were changed.

Image Forming

As the non-porous substrate, a polyethylene terephthalate film (SP value=10.7 $MPa^{1/2}$, the Cobb water absorption degree=0.0015 $g/m^2$; hereinafter, referred to as a PET film) was prepared, the ink jet ink prepared as described above was ejected from a thermal ink jet head of an ink jet printer loaded with it, by 6 pl dots onto the PET film. Then, the PET film was heated and dried at "strong" (120° C.) using a drier WIND-PRESS-EH5402 (manufactured by Panasonic Inc. (Matsushita Electric Industrial)) (trade name) at a height of 10 cm from the ejection surface of the PET film for 10 seconds to 60 seconds.

In the ink jet inks, drying time, stickiness of ejection surface (ink surface) after drying, and fixability (surface gloss) were evaluated by the following methods. The evaluation result is shown in Table 2.

Evaluation (1) Drying Time

After ejection, the ink surface was observed by the naked eye from the time at which blowing from the drier was started, the time (sec) until wetness on the surface disappeared was counted, and the resulting time interval was the drying time.

(2) Stickiness

After drying was completed at the drying time in (1), stickiness was evaluated by touch on the basis of the following evaluation standards by touching the ejection surface with a finger and moving the finger.

Evaluation Standards

A: There was no feeling of adhesion between the finger and the ejection surface.

B: When the ejection surface was slightly rubbed, there was a slight sticky feeling but no adhesion.

C: When the ejection surface was touched, there was stickiness, and the finger adhered thereto, to a degree which would not be practically tolerable.

(3) Fixability (Surface Gloss)

Gloss was evaluated by observing the ejection surface after drying at the drying time in (1) on the basis of the following evaluation standards.

Evaluation Standards

A: Uniform light reflection was shown over the whole surface of the image

B: Surface reflection of a part of the image was slightly different from that of the other parts, and thus slight non-uniformity was seen.

C: The surface of the image had a ground-glass configuration with no gloss, to a degree which would not be practically permissible.

TABLE 2

| Ink No. | Volatile Organic Solvent Kind | Sp Value MPa$^{1/2}$ | Content [mass %] | Absolute Value of Difference between SP values \|ΔSP\| (*1) | Latex Polymer Colloid Liquid No. | Tg [°C.] | Content [Mass %] | Evaluation Fixability | Drying Time [sec] | Stickiness | Note |
|---|---|---|---|---|---|---|---|---|---|---|---|
| 1 | 1,4-butanediol | 30.27 | 8 | 19.57 | 1 | 19.4 | 4 | A | 40 | C | Comp. |
| 2 | diethylene glycol | 30.62 | 8 | 19.92 | 2 | 28.7 | 4 | A | 40 | C | Comp. |
| 3 | | | | | 6 | 55.9 | 4 | C | 30 | B | Comp. |
| 4 | 1,2-hexanediol | 27.36 | 8 | 16.66 | 1 | 19.4 | 4 | A | 40 | C | Comp. |
| 5 | dipropylene glycol | 27.73 | 8 | 17.03 | 2 | 28.7 | 4 | A | 40 | C | Comp. |
| 6 | | | | | 6 | 55.9 | 4 | C | 30 | A | Comp. |
| 7 | propylene glycol | 24.47 | 8 | 13.77 | 1 | 19.4 | 4 | A | 30 | C | Comp. |
| 8 | phenylether | 24.85 | 8 | 14.15 | 2 | 28.7 | 4 | A | 20 | B | Ex. |
| 9 | 2,5-dimethyl-2,5- | | | | 3 | 38.5 | 4 | A | 20 | A | Ex. |
| 10 | hexanediol | | | | 4 | 93.0 | 4 | C | 20 | A | Comp. |
| 11 | | | | | 5 | 77.1 | 4 | B | 20 | A | Ex. |
| 12 | | | | | 6 | 55.9 | 4 | A | 20 | A | Ex. |
| 13 | 2,2,4-trimethyl- | 23.68 | 8 | 12.98 | 2 | 28.7 | 4 | A | 20 | A | Ex. |
| 14 | 1,3-pentanediol | 22.13 | 8 | 11.43 | 4 | 93.0 | 4 | C | 20 | A | Comp. |
| 15 | triethylene glycol | | | | 5 | 77.1 | 4 | A | 20 | A | Ex. |
| 16 | methylether | | | | 6 | 55.9 | 4 | A | 20 | A | Ex. |
| 17 | tripropylene | 20.65 | 8 | 9.95 | 2 | 28.7 | 4 | A | 15 | A | Ex. |
| 18 | glycolpropylether | 20.91 | 8 | 10.21 | 4 | 93.0 | 4 | C | 15 | A | Comp. |
| 19 | dipropyleneglycol | | | | 5 | 77.1 | 4 | A | 15 | A | Ex. |
| 20 | butylether | | | | 6 | 55.9 | 4 | A | 15 | A | Ex. |
| 21 | dipropylene glycol triethylene glycol methylether | 27.73 22.13 | 8 8 | 17.03 11.43 | 3 | 38.5 | 4 | A | 25 | B | Ex. |
| 22 | Structure Formula (1) l + m + n = 4 tripropylene glycol monomethylether | 24.9 21.1 | 8 8 | 14.20 10.40 | 3 | 38.5 | 4 | A | 25 | A | Ex. |
| 23 | diethylene glycol dimetylether ethylene glycol | 19.2 14.6 | 8 8 | 8.50 3.90 | 2 | 28.7 | 4 | C | 15 | A | Comp. |

(*1): absolute value [MPa$^{1/2}$] of difference between SP value of non-porous substrate and SP value of volatile cosolvent in ink
Fixability was evaluated by viewing the surface gloss of the printed image after drying.
Note:
Com.: Comparative Example, Exa.: Example Details of the volatile organic solvent in Table 2 are as follows.

Propylene glycol phenyl ether: Boiling Point=243° C., Decomposition Temperature=300° C. or higher 2,5-dimethyl-2,5-hexanediol: Boiling Point=214° C., Decomposition Temperature=300° C. or higher 2,2,4-trimethyl-1,3-pentandiol: Boiling Point=232° C., Decomposition Temperature=300° C.

Triethylene glycol methyl ether: Boiling Point=249° C., Decomposition Temperature=300° C. or higher Tripropyrene glycol propyl ether: Boiling Point=261° C., Decomposition Temperature=300° C. or higher Dipropylene glycol butyl ether: Boiling Point=230° C., Decomposition Temperature=300° C. or higher Compound represented by the structural formula (1) [l+m+n=4]: No Boiling Point, Decomposition Temperature=300° C. or higher Tripropylene glycol monomethyl ether: Boiling Point=243° C., Decomposition Temperature=300° C. or higher As shown in Table 2, in the aspect of the invention, the drying efficiency is good, the fixing time can be reduced, the stickiness of the formed dried image is reduced, and image quality and film performance are excellent. On the contrary, in Comparative Examples, the fixation property or the effect of preventing stickiness in the dried image is insufficient.

The invention includes the following exemplary embodiments.

(1) An image forming method including:
ejecting an ink composition including a volatile organic solvent with a solubility parameter (SP value) of 20 to 25 MPa$^{1/2}$, acid-functionalized polymer colloid particles with a glass transition temperature of 25 to 85° C., and a pigment with a surface at least a part of which is coated with a polymer, onto a non-porous substrate by an ink jet method to form an image,
wherein the absolute value of the difference between a solubility parameter (SP value) of the non-porous substrate and the solubility parameter of the volatile organic solvent of the ink composition falls within 15 MPa$^{1/2}$.

(2) The image forming method according to the above (1), wherein the solubility parameter of the volatile organic solvent is 20 to 24 MPa$^{1/2}$.

(3) The image forming method according to the above (1), wherein the glass transition temperature of the acid-functionalized polymer colloid particles is 35 to 80° C.

(4) The image forming method according to the above (1), wherein the particle size of the acid-functionalized polymer colloid particles is from 20 nm to 500 nm.

(5) The image forming method according to the above (1), wherein the content of the acid-functionalized polymer colloid particles is from 4% by mass to 15% by mass relative to the total mass of the ink composition.

(6) The image forming method according to the above (1), wherein the total content of the volatile organic solvent is 5% by mass to 18% by mass relative to the total mass of the ink composition.

(7) The image forming method according to the above (1), wherein the volatile organic solvent has a boiling point from 120° C. to 285° C. or a decomposition temperature of 300° C. or higher.

(8) The image forming method according to the above (1), wherein the Cobb water absorption degree of the non-porous substrate for a contact time of 120 seconds on the surface thereof by a water-absorptivity test based on JIS P8140 is 1 g/m² or less.

(9) The image forming method according to the above (1), wherein the non-porous substrate is a plastic film.

(10) The image forming method according to the above (9), wherein the non-porous substrate is a polyethylene terephthalate film or a triacetate cellulose film.

(11) The image forming method according to the above (1), wherein the volatile organic solvent includes an alkylene oxide adduct of glycerin represented by the following structural formula (1), and alkylene glycol alkyl ether:

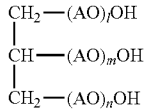

Structural Formula (1)

where AO represents at least one of ethyleneoxy and propyleneoxy, each of l, m, and n independently represents an integer of 1 or more, and l, m, and n satisfy the relationship l+m+n=3 to 15.

(12) The image forming method according to the above (1), wherein the acid-functionalized polymer colloid particles are carboxylic acid-group-containing polymer particles in which (meth)acrylic acid is copolymerized.

(13) The image forming method according to the above (11), wherein a mixing weight ratio (a:b) of the alkylene oxide adduct (a) of glycerin represented by the structural formula (1) to the alkylene glycol alkyl ether (b) is 1:2.5 to 2.5:1.

All publications, patent applications, and technical standards mentioned in this specification are herein incorporated by reference to the same extent as if each individual publication, patent application, or technical standard was specifically and individually indicated to be incorporated by reference.

What is claimed is:

1. An image forming method comprising:
   ejecting an ink composition including a volatile organic solvent with a solubility parameter (SP value) of 20 MPa^{1/2} to 25 MPa^{1/2}, acid-functionalized polymer colloid particles with a glass transition temperature of 25° C. to 85° C., and a pigment with a surface at least a part of which is coated with a polymer, onto a non-porous substrate by an ink jet method to form an image,
   wherein the absolute value of the difference between a solubility parameter (SP value) of the non-porous substrate and the solubility parameter of the volatile organic solvent of the ink composition is less than or equal to 15 MPa^{1/2}, and
   wherein the volatile organic solvent includes alkylene glycol alkyl ether and an alkylene oxide adduct of glycerin represented by the following structural formula (1):

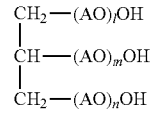

Structural Formula (1)

wherein AO represents propyleneoxy, each of l, m, and n independently represents an integer of 1 or more, and the sum of l, m, and n equals 4.

2. The image forming method according to claim 1, wherein the solubility parameter of the volatile organic solvent is 20 MPa^{1/2} to 24 MPa^{1/2}.

3. The image forming method according to claim 1, wherein the glass transition temperature of the acid-functionalized polymer colloid particles is 35° C. to 80° C.

4. The image forming method according to claim 1, wherein the particle size of the acid-functionalized polymer colloid particles is from 20 nm to 500 nm.

5. The image forming method according to claim 1, wherein the content of the acid-functionalized polymer colloid particles is 4% by mass to 15% by mass relative to the total mass of the ink composition.

6. The image forming method according to claim 1, wherein the total content of the volatile organic solvent is 5% by mass to 18% by mass relative to the total mass of the ink composition.

7. The image forming method according to claim 1, wherein the volatile organic solvent has a boiling point of from 120° C. to 285° C. or a decomposition temperature of 300° C. or higher.

8. The image forming method according to claim 1, wherein the Cobb water absorption degree of the non-porous substrate for a contact time of 120 seconds on the surface thereof by a water absorption test based on JIS P8140 is 1 g/m² or less.

9. The image forming method according to claim 1, wherein the non-porous substrate is a plastic film.

10. The image forming method according to claim 9, wherein the non-porous substrate is a polyethylene terephthalate film or a triacetate cellulose film.

11. The image forming method according to claim 1, wherein the acid-functionalized polymer colloid particles are carboxylic acid-group containing polymer particles in which (meth)acrylic acid is copolymerized.

12. The image forming method according to claim 1, wherein a mixing weight ratio (a:b) of the alkylene oxide adduct (a) of glycerin represented by the structural formula (1) to the alkylene glycol alkyl ether (b) is 1:2.5 to 2.5:1.

* * * * *